United States Patent [19]
Watanabe

[11] Patent Number: 4,531,153
[45] Date of Patent: Jul. 23, 1985

[54] METHOD AND APPARATUS FOR ENCODING AND DECODING A BINARY DIGITAL INFORMATION SIGNAL

[75] Inventor: Kenji Watanabe, Yokohama, Japan

[73] Assignee: Sony Corporation, Tokyo, Japan

[21] Appl. No.: 437,700

[22] Filed: Oct. 29, 1982

[51] Int. Cl.³ .............................................. H04N 5/16
[52] U.S. Cl. ............................ 358/141; 340/347 DD; 358/11; 358/13
[58] Field of Search ..................... 358/141, 11, 12, 13; 375/17, 18, 19; 340/347 DD; 360/32, 34.1, 33.1

[56] References Cited

U.S. PATENT DOCUMENTS

| | | | |
|---|---|---|---|
| 3,902,117 | 8/1975 | Sheppard | 375/19 |
| 4,027,335 | 5/1977 | Miller | 375/19 |
| 4,095,259 | 6/1978 | Sawagata | 358/141 |
| 4,387,364 | 6/1983 | Shirota | 340/347 DD |
| 4,408,189 | 10/1983 | Betts | 375/19 |

*Primary Examiner*—Michael A. Masinick
*Attorney, Agent, or Firm*—Lewis H. Eslinger; Alvin Sinderbrand

[57] ABSTRACT

A system of encoding an original binary digital video signal comprised of a plurality of first 8-bit words having an absolute value and a digital sum variation, to produce an encoded binary digital video signal, converts each first 8-bit word into a second 8-bit word also having an absolute value and a digital sum variation such that, with respect to predetermined groups of correlative first 8-bit words, that is, first 8-bit words having absolute values which are close to each other, second 8-bit words corresponding to the first 8-bit words in each respective group have the same digital sum variation; and then inverts every alternate m second 8-bit words, where m=1, 2, 3 . . . , to form the encoded binary digital video signal with substantially reduced DC content while maintaining the same recording bit rate.

12 Claims, 9 Drawing Figures

| VALUE | NATURAL BINARY CODE | CDS |
|---|---|---|
| 124 | 01111100 | +2 |
| 125 | 01111101 | +4 |
| 126 | 01111110 | +4 |
| 127 | 01111111 | +6 |
| 128 | 10000000 | -6 |
| 129 | 10000001 | -4 |
| 130 | 10000010 | -4 |
| 131 | 10000011 | -2 |

| SIGNAL PROCESS | AVERAGE VALUE OF CDS | MAXIMUM VALUE OF DSV | FINAL VALUE OF DSV |
|---|---|---|---|
| NATURAL BINARY CODE | -0.55 | 21358 | -21358 |
| INVERTING PROCESS | -0.02 | 944 | -810 |
| DSVCC | -1.20 | 46864 | -46864 |
| INVERTING PROCESS | -0.0007 | 104 | -28 |

FIG.4A

| ORIGINAL VALUE | REPLACEMENT VALUE | DSVCC | CDS | ORIGINAL VALUE | REPLACEMENT VALUE | DSVCC | CDS |
|---|---|---|---|---|---|---|---|
| 0 | 0 | 00000000 | -8 | | | | |
| 1 | 1 | 00000001 | -6 | 2 | 2 | 00000010 | -6 |
| 3 | 4 | 00000100 | -6 | 4 | 8 | 00001000 | -6 |
| 5 | 16 | 00010000 | -6 | 6 | 32 | 00100000 | -6 |
| 7 | 64 | 01000000 | -6 | 8 | 128 | 10000000 | -6 |
| 9 | 3 | 00000011 | -4 | 10 | 5 | 00000101 | -4 |
| 11 | 6 | 00000110 | -4 | 12 | 9 | 00001001 | -4 |
| 13 | 10 | 00001010 | -4 | 14 | 12 | 00001100 | -4 |
| 15 | 17 | 00010001 | -4 | 16 | 18 | 00010010 | -4 |
| 17 | 20 | 00010100 | -4 | 18 | 24 | 00011000 | -4 |
| 19 | 33 | 00100001 | -4 | 20 | 34 | 00100010 | -4 |
| 21 | 36 | 00100100 | -4 | 22 | 40 | 00101000 | -4 |
| 23 | 48 | 00110000 | -4 | 24 | 65 | 01000001 | -4 |
| 25 | 66 | 01000010 | -4 | 26 | 68 | 01000100 | -4 |
| 27 | 72 | 01001000 | -4 | 28 | 80 | 01010000 | -4 |
| 29 | 96 | 01100000 | -4 | 30 | 129 | 10000001 | -4 |
| 31 | 130 | 10000010 | -4 | 32 | 132 | 10000100 | -4 |
| 33 | 136 | 10001000 | -4 | 34 | 144 | 10010000 | -4 |
| 35 | 160 | 10100000 | -4 | 36 | 192 | 11000000 | -4 |
| 37 | 7 | 00000111 | -2 | 38 | 11 | 00001011 | -2 |
| 39 | 13 | 00001101 | -2 | 40 | 14 | 00001110 | -2 |
| 41 | 19 | 00010011 | -2 | 42 | 21 | 00010101 | -2 |
| 43 | 22 | 00010110 | -2 | 44 | 25 | 00011001 | -2 |
| 45 | 26 | 00011010 | -2 | 46 | 28 | 00011100 | -2 |
| 47 | 35 | 00100011 | -2 | 48 | 37 | 00100101 | -2 |
| 49 | 38 | 00100110 | -2 | 50 | 41 | 00101001 | -2 |
| 51 | 42 | 00101010 | -2 | 52 | 44 | 00101100 | -2 |
| 53 | 49 | 00110001 | -2 | 54 | 50 | 00110010 | -2 |
| 55 | 52 | 00110100 | -2 | 56 | 56 | 00111000 | -2 |
| 57 | 67 | 01000011 | -2 | 58 | 69 | 01000101 | -2 |
| 59 | 70 | 01000110 | -2 | 60 | 73 | 01001001 | -2 |
| 61 | 74 | 01001010 | -2 | 62 | 76 | 01001100 | -2 |
| 63 | 81 | 01010001 | -2 | 64 | 82 | 01010010 | -2 |
| 65 | 84 | 01010100 | -2 | 66 | 88 | 01011000 | -2 |
| 67 | 97 | 01100001 | -2 | 68 | 98 | 01100010 | -2 |
| 69 | 100 | 01100100 | -2 | 70 | 104 | 01101000 | -2 |
| 71 | 112 | 01110000 | -2 | 72 | 131 | 10000011 | -2 |
| 73 | 133 | 10000101 | -2 | 74 | 134 | 10000110 | -2 |
| 75 | 137 | 10001001 | -2 | 76 | 138 | 10001010 | -2 |
| 77 | 140 | 10001100 | -2 | 78 | 145 | 10010001 | -2 |
| 79 | 146 | 10010010 | -2 | 80 | 148 | 10010100 | -2 |
| 81 | 152 | 10011000 | -2 | 82 | 161 | 10100001 | -2 |
| 83 | 162 | 10100010 | -2 | 84 | 164 | 10100100 | -2 |

FIG. 4B

| ORIGINAL VALUE | REPLACEMENT VALUE | DSVCC | CDS | ORIGINAL VALUE | REPLACEMENT VALUE | DSVCC | CDS |
|---|---|---|---|---|---|---|---|
| 85 | 168 | 10101000 | −2 | 86 | 176 | 10110000 | −2 |
| 87 | 193 | 11000001 | −2 | 88 | 194 | 11000010 | −2 |
| 89 | 196 | 11000100 | −2 | 90 | 200 | 11001000 | −2 |
| 91 | 208 | 11010000 | −2 | 92 | 224 | 11100000 | −2 |
| 93 | 15 | 00001111 | 0 | 94 | 23 | 00010111 | 0 |
| 95 | 27 | 00011011 | 0 | 96 | 29 | 00011101 | 0 |
| 97 | 30 | 00011110 | 0 | 98 | 39 | 00100111 | 0 |
| 99 | 43 | 00101011 | 0 | 100 | 45 | 00101101 | 0 |
| 101 | 46 | 00101110 | 0 | 102 | 51 | 00110011 | 0 |
| 103 | 53 | 00110101 | 0 | 104 | 54 | 00110110 | 0 |
| 105 | 57 | 00111001 | 0 | 106 | 58 | 00111010 | 0 |
| 107 | 60 | 00111100 | 0 | 108 | 71 | 01000111 | 0 |
| 109 | 75 | 01001011 | 0 | 110 | 77 | 01001101 | 0 |
| 111 | 78 | 01001110 | 0 | 112 | 83 | 01010011 | 0 |
| 113 | 85 | 01010101 | 0 | 114 | 86 | 01010110 | 0 |
| 115 | 89 | 01011001 | 0 | 116 | 90 | 01011010 | 0 |
| 117 | 92 | 01011100 | 0 | 118 | 99 | 01100011 | 0 |
| 119 | 101 | 01100101 | 0 | 120 | 102 | 01100110 | 0 |
| 121 | 105 | 01101001 | 0 | 122 | 106 | 01101010 | 0 |
| 123 | 108 | 01101100 | 0 | 124 | 113 | 01110001 | 0 |
| 125 | 114 | 01110010 | 0 | 126 | 116 | 01110100 | 0 |
| 127 | 120 | 01111000 | 0 | 128 | 135 | 10000111 | 0 |
| 129 | 139 | 10001011 | 0 | 130 | 141 | 10001101 | 0 |
| 131 | 142 | 10001110 | 0 | 132 | 147 | 10010011 | 0 |
| 133 | 149 | 10010101 | 0 | 134 | 150 | 10010110 | 0 |
| 135 | 153 | 10011001 | 0 | 136 | 154 | 10011010 | 0 |
| 137 | 156 | 10011100 | 0 | 138 | 163 | 10100011 | 0 |
| 139 | 165 | 10100101 | 0 | 140 | 166 | 10100110 | 0 |
| 141 | 169 | 10101001 | 0 | 142 | 170 | 10101010 | 0 |
| 143 | 172 | 10101100 | 0 | 144 | 177 | 10110001 | 0 |
| 145 | 178 | 10110010 | 0 | 146 | 180 | 10110100 | 0 |
| 147 | 184 | 10111000 | 0 | 148 | 195 | 11000011 | 0 |
| 149 | 197 | 11000101 | 0 | 150 | 198 | 11000110 | 0 |
| 151 | 201 | 11001001 | 0 | 152 | 202 | 11001010 | 0 |
| 153 | 204 | 11001100 | 0 | 154 | 209 | 11010001 | 0 |
| 155 | 210 | 11010010 | 0 | 156 | 212 | 11010100 | 0 |
| 157 | 216 | 11011000 | 0 | 158 | 225 | 11100001 | 0 |
| 159 | 226 | 11100010 | 0 | 160 | 228 | 11100100 | 0 |
| 161 | 232 | 11101000 | 0 | 162 | 240 | 11110000 | 0 |
| 163 | 31 | 00011111 | 2 | 164 | 47 | 00101111 | 2 |
| 165 | 55 | 00110111 | 2 | 166 | 59 | 00111011 | 2 |
| 167 | 61 | 00111101 | 2 | 168 | 62 | 00111110 | 2 |
| 169 | 79 | 01001111 | 2 | 170 | 87 | 01010111 | 2 |
| 171 | 91 | 01011011 | 2 | 172 | 93 | 01011101 | 2 |

FIG. 4C

| ORIGINAL VALUE | REPLACEMENT VALUE | DSVCC | CDS | ORIGINAL VALUE | REPLACEMENT VALUE | DSVCC | CDS |
|---|---|---|---|---|---|---|---|
| 173 | 94 | 01011110 | 2 | 174 | 103 | 01100111 | 2 |
| 175 | 107 | 01101011 | 2 | 176 | 109 | 01101101 | 2 |
| 177 | 110 | 01101110 | 2 | 178 | 115 | 01110011 | 2 |
| 179 | 117 | 01110101 | 2 | 180 | 118 | 01110110 | 2 |
| 181 | 121 | 01111001 | 2 | 182 | 122 | 01111010 | 2 |
| 183 | 124 | 01111100 | 2 | 184 | 143 | 10001111 | 2 |
| 185 | 151 | 10010111 | 2 | 186 | 155 | 10011011 | 2 |
| 187 | 157 | 10011101 | 2 | 188 | 158 | 10011110 | 2 |
| 189 | 167 | 10100111 | 2 | 190 | 171 | 10101011 | 2 |
| 191 | 173 | 10101101 | 2 | 192 | 174 | 10101110 | 2 |
| 193 | 179 | 10110011 | 2 | 194 | 181 | 10110101 | 2 |
| 195 | 182 | 10110110 | 2 | 196 | 185 | 10111001 | 2 |
| 197 | 186 | 10111010 | 2 | 198 | 188 | 10111100 | 2 |
| 199 | 199 | 11000111 | 2 | 200 | 203 | 11001011 | 2 |
| 201 | 205 | 11001101 | 2 | 202 | 206 | 11001110 | 2 |
| 203 | 211 | 11010011 | 2 | 204 | 213 | 11010101 | 2 |
| 205 | 214 | 11010110 | 2 | 206 | 217 | 11011001 | 2 |
| 207 | 218 | 11011010 | 2 | 208 | 220 | 11011100 | 2 |
| 209 | 227 | 11100011 | 2 | 210 | 229 | 11100101 | 2 |
| 211 | 230 | 11100110 | 2 | 212 | 233 | 11101001 | 2 |
| 213 | 234 | 11101010 | 2 | 214 | 236 | 11101100 | 2 |
| 215 | 241 | 11110001 | 2 | 216 | 242 | 11110010 | 2 |
| 217 | 244 | 11110100 | 2 | 218 | 248 | 11111000 | 2 |
| 219 | 63 | 00111111 | 4 | 220 | 95 | 01011111 | 4 |
| 221 | 111 | 01101111 | 4 | 222 | 119 | 01110111 | 4 |
| 223 | 123 | 01111011 | 4 | 224 | 125 | 01111101 | 4 |
| 225 | 126 | 01111110 | 4 | 226 | 159 | 10011111 | 4 |
| 227 | 175 | 10101111 | 4 | 228 | 183 | 10110111 | 4 |
| 229 | 187 | 10111011 | 4 | 230 | 189 | 10111101 | 4 |
| 231 | 190 | 10111110 | 4 | 232 | 207 | 11001111 | 4 |
| 233 | 215 | 11010111 | 4 | 234 | 219 | 11011011 | 4 |
| 235 | 221 | 11011101 | 4 | 236 | 222 | 11011110 | 4 |
| 237 | 231 | 11100111 | 4 | 238 | 235 | 11101011 | 4 |
| 239 | 237 | 11101101 | 4 | 240 | 238 | 11101110 | 4 |
| 241 | 243 | 11110011 | 4 | 242 | 245 | 11110101 | 4 |
| 243 | 246 | 11110110 | 4 | 244 | 249 | 11111001 | 4 |
| 245 | 250 | 11111010 | 4 | 246 | 252 | 11111100 | 4 |
| 247 | 127 | 01111111 | 6 | 248 | 191 | 10111111 | 6 |
| 249 | 223 | 11011111 | 6 | 250 | 239 | 11101111 | 6 |
| 251 | 247 | 11110111 | 6 | 252 | 251 | 11111011 | 6 |
| 253 | 253 | 11111101 | 6 | 254 | 254 | 11111110 | 6 |
| 255 | 255 | 11111111 | 8 | | | | |

FIG. 5

| ORIGINAL VALUE | NATURAL-BINARY | CDS | DSV CC | CDS |
|---|---|---|---|---|
| 0 | 0 0 0 0 0 0 0 0 | -8 | 0 0 0 0 0 0 0 0 | -8 |
| 1 | 0 0 0 0 0 0 0 1 | -6 | 0 0 0 0 0 0 0 1 | |
| 2 | 0 0 0 0 0 0 1 0 | -6 | 0 0 0 0 0 0 1 0 | |
| 3 | 0 0 0 0 0 0 1 1 | -4 | 0 0 0 0 0 1 0 0 | |
| 4 | 0 0 0 0 0 1 0 0 | -6 | 0 0 0 0 1 0 0 0 | -6 |
| 5 | 0 0 0 0 0 1 0 1 | -4 | 0 0 0 1 0 0 0 0 | |
| 6 | 0 0 0 0 0 1 1 0 | -4 | 0 0 1 0 0 0 0 0 | |
| 7 | 0 0 0 0 0 1 1 1 | -2 | 0 1 0 0 0 0 0 0 | |
| 8 | 0 0 0 0 1 0 0 0 | -6 | 1 0 0 0 0 0 0 0 | |
| 9 | 0 0 0 0 1 0 0 1 | -4 | 0 0 0 0 0 0 1 1 | |
| 10 | 0 0 0 0 1 0 1 0 | -4 | 0 0 0 0 0 1 0 1 | |
| 11 | 0 0 0 0 1 0 1 1 | -2 | 0 0 0 0 0 1 1 0 | |
| 12 | 0 0 0 0 1 1 0 0 | -4 | 0 0 0 0 1 0 0 1 | |
| 13 | 0 0 0 0 1 1 0 1 | -2 | 0 0 0 0 1 0 1 0 | |
| 14 | 0 0 0 0 1 1 1 0 | -2 | 0 0 0 0 1 1 0 0 | |
| 15 | 0 0 0 0 1 1 1 1 | 0 | 0 0 0 1 0 0 0 1 | |
| 16 | 0 0 0 1 0 0 0 0 | -6 | 0 0 0 1 0 0 1 0 | |
| 17 | 0 0 0 1 0 0 0 1 | -4 | 0 0 0 1 0 1 0 0 | |
| 18 | 0 0 0 1 0 0 1 0 | -4 | 0 0 0 1 1 0 0 0 | |
| 19 | 0 0 0 1 0 0 1 1 | -2 | 0 0 1 0 0 0 0 1 | |
| 20 | 0 0 0 1 0 1 0 0 | -4 | 0 0 1 0 0 0 1 0 | |
| 21 | 0 0 0 1 0 1 0 1 | -2 | 0 0 1 0 0 1 0 0 | -4 |
| 22 | 0 0 0 1 0 1 1 0 | -2 | 0 0 1 0 1 0 0 0 | |
| 23 | 0 0 0 1 0 1 1 1 | 0 | 0 0 1 1 0 0 0 0 | |
| 24 | 0 0 0 1 1 0 0 0 | -4 | 0 1 0 0 0 0 0 1 | |
| 25 | 0 0 0 1 1 0 0 1 | -2 | 0 1 0 0 0 0 1 0 | |
| 26 | 0 0 0 1 1 0 1 0 | -2 | 0 1 0 0 0 1 0 0 | |
| 27 | 0 0 0 1 1 0 1 1 | 0 | 0 1 0 0 1 0 0 0 | |
| 28 | 0 0 0 1 1 1 0 0 | -2 | 0 1 0 1 0 0 0 0 | |
| 29 | 0 0 0 1 1 1 0 1 | 0 | 0 1 1 0 0 0 0 0 | |
| 30 | 0 0 0 1 1 1 1 0 | 0 | 1 0 0 0 0 0 0 1 | |
| 31 | 0 0 0 1 1 1 1 1 | +2 | 1 0 0 0 0 0 1 0 | |
| 32 | 0 0 1 0 0 0 0 0 | -6 | 1 0 0 0 0 1 0 0 | |
| 33 | 0 0 1 0 0 0 0 1 | -4 | 1 0 0 0 1 0 0 0 | |
| 34 | 0 0 1 0 0 0 1 0 | -4 | 1 0 0 1 0 0 0 0 | |
| 35 | 0 0 1 0 0 0 1 1 | -2 | 1 0 1 0 0 0 0 0 | |
| 36 | 0 0 1 0 0 1 0 0 | -4 | 1 1 0 0 0 0 0 0 | |
| 37 | 0 0 1 0 0 1 0 1 | -2 | 0 0 0 0 0 1 1 1 | |
| 38 | 0 0 1 0 0 1 1 0 | -2 | 0 0 0 0 1 0 1 1 | -2 |
| 249 | 1 1 1 1 1 0 0 1 | +4 | 1 1 0 1 1 1 1 1 | |
| 250 | 1 1 1 1 1 0 1 0 | +4 | 1 1 1 0 1 1 1 1 | |
| 251 | 1 1 1 1 1 0 1 1 | +6 | 1 1 1 1 0 1 1 1 | +6 |
| 252 | 1 1 1 1 1 1 0 0 | +4 | 1 1 1 1 1 0 1 1 | |
| 253 | 1 1 1 1 1 1 0 1 | +6 | 1 1 1 1 1 1 0 1 | |
| 254 | 1 1 1 1 1 1 1 0 | +6 | 1 1 1 1 1 1 1 0 | |
| 255 | 1 1 1 1 1 1 1 1 | +8 | 1 1 1 1 1 1 1 1 | +8 |

METHOD AND APPARATUS FOR ENCODING AND DECODING A BINARY DIGITAL INFORMATION SIGNAL

BACKGROUND OF THE INVENTION

This invention relates generally to a method and apparatus for encoding and decoding an information signal and, in particular, is directed to a method and apparatus for encoding and decoding binary data words into a binary digital code of the same length.

Conventionally, apparatus for recording and reproducing a color video signal have been of the analog, rather than digital, type. However, due to progress in the field of high density digital recording, it has recently proved feasible to use digital video tape recorders (VTR) for recording and reproducing a digitized color video signal. With digital VTRs, an analog video signal is sampled every n bits for each digital word, for example, where n=8, and is thereby converted into a digital color video signal comprised of 8-bit words.

However, such 8-bit digital information signal generally includes a DC component, that is, the number of "1" or "0" bits is greater than the number of bits of the other type. Because conventional magnetic recording-/reproducing apparatus is not responsive to direct current, any DC component of a transmitted or reproduced signal is likely to be lost.

A general indication of the DC content of a digital information signal is the digital sum variation (DSV) which is the instantaneous value of the integration of the digital information signal. If the DSV increases or decreases indefinitely, the digital information signal has a DC component, and if the DSV is limited or bounded, the digital information signal is DC free. In particular, the closer that the DSV is to zero, the fewer DC components exist in the signal.

In order to reduce the DSV, and thereby the DC content of an 8-bit digital information signal, various block encoding systems such as an 8-9 code conversion system, an 8-10 code conversion system and various other encoding systems, for example, $M^2$ (modified Miller) encoding, and the like have been proposed. However, with the aforementioned encoding systems, the recording bit rate becomes greater than the source bit rate, that is, by expanding the length of each 8-bit data word to 9 bits, 10 bits, 16 bits or the like, the DSV of the digital information signal to be recorded is minimized at the expense of an increased recording bit rate. It is to be appreciated that this latter aspect is contrary to the desire that the recording bit rate be as low as possible to increase the amount of information that can be recorded on the record medium. In this regard, because of the desire to increase the information in a digital information signal, the source bit rate may increase, and accordingly, it is not practically possible to increase the recording bit rate. It is therefore desirable to reduce the DSV of the digital information signal to be recorded while maintaining the source bit rate for the encoded digital information signal to be recorded.

OBJECTS AND SUMMARY OF THE INVENTION

Accordingly, it is an object of this invention to provide a method and apparatus for encoding and decoding a digital information signal that avoids the above-described difficulties encountered with the prior art.

More particularly, it is an object of this invention to provide a method and apparatus for encoding and decoding a digital information signal which reduces the DC content of the digital information signal.

It is another object of this invention to provide a method and apparatus for encoding and decoding a digital information signal which reduces the DSV of the digital information signal.

It is still another object of this invention to provide a method and apparatus for encoding and decoding a digital information signal without increasing the recording bit rate, while also reducing the DSV of the digital information signal.

In accordance with an aspect of this invention, a method of encoding a binary digital signal comprised of a plurality of first n-bit words having an absolute value and a digital sum variation to produce an encoded binary digital signal, includes the steps of converting each first n-bit word to a second n-bit word having an absolute value and a digital sum variation such that, with respect to predetermined groups of correlative first n-bit words, the second n-bit words corresponding to the first n-bit words in each respective group have the same digital sum variation; and inverting every alternate m second n-bit words, where m =1, 2, 3 . . .

In accordance with another aspect of this invention, apparatus for encoding a binary digital signal comprised of a plurality of first n-bit words having an absolute value and a digital sum variation to produce an encoded binary digital signal, includes means for converting each first n-bit word into a second n-bit word having an absolute value and a digital sum variation such that, with respect to predetermined groups of correlative first n-bit words, the second n-bit words corresponding to the first n-bit words in each respective group have the same digital sum variation; and means for inverting every alternate m second n-bit words, where m = 1, 2, 3 . . .

The above, and other, objects, features and advantages of the invention will become apparent from the following detailed description of an illustrative embodiment of the invention which is to be ready in connection with the accompanying drawings.

BRIEF DESCRIPTION OF THE DRAWINGS

FIGS. 4A–4C are mapping tables used for illustrating the method of encoding according to one embodiment of the present invention;

FIG. 5 is table used for comparing CDS values for groupings of binary digital information words and the same binary digital information words encoded according to the present invention;

DETAILED DESCRIPTION OF A PREFERRED EMBODIMENT

Figures 1, 2, 3:
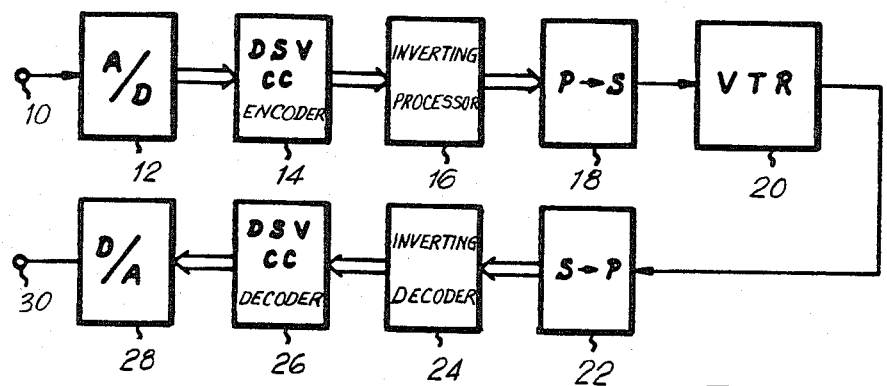
FIG. 1 is a block diagram of a digital information signal recording/reproducing apparatus according to one embodiment of this invention.
FIG. 2 is a table of selected 8-bit binary data words used to illustrate a problem in recording a binary digital information signal.
FIG. 3 is a table illustrating various characteristics of a binary digital information signal and of the same binary digital information signal encoded in accordance with the present invention.

In order to facilitate a better understanding of the present invention, there will first be described conditions for reducing the DC content of a binary digital information signal. Referring first to FIG. 2, 8-bit natural binary code words are shown for numbers 124 through 131, that is, numbers having absolute decimal values (hereinafter also referred to as original values) of 124 through 131. For example, the 8-bit natural binary code word for the number 124 is represented by [01111100]. The Code word Digital Sum (CDS) for an 8-bit binary code word represents the value of the DSV for that code word and is an indication of the DC content thereof. The DSV, as previously discussed, is the instantaneous value of the integration of the encoded binary digital information signal. Since the integration of a high level or logic level "1" pulse is a positive ramp and the integration of a low level or logic level "0" pulse is a negative ramp, the DSV can be calculated by assigning a +1 value to logic level "1" bits and a −1 value to logic level "0" bits. Thus, for example, for the number 124, the CDS has a value +2 since there are five "1" bits having a value +1 and three "0" bits having a value −1. Accordingly, if the CDS values for each word of a binary digital information signal are added together, the DSV for the signal can be obtained. It is to be appreciated that the DSV is an indication of the DC content of the binary digital information signal. In particular, when the DSV is close to zero, the DC content is small. The present invention is designed to minimize the DSV without increasing the recording bit rate of the binary digital information signal.

It is to be appreciated that the absolute value of one 8-bit word of the natural binary digital information signal does not change by a large amount from the absolute value of an adjacent 8-bit word of the digital information signal. In other words, adjacent 8-bit words of the digital information signal are correlative, that is, have absolute values which are close to each other. In fact, groups of successive or neighboring 8-bit words of the digital information signal can be considered to be correlative, that is, have absolute values close to each other. However, such correlative 8-bit words of the digital information signal in each group may have CDS values which change drastically. For example, as shown in FIG. 2, correlative 8-bit words corresponding to numbers 127 and 128 have CDS values +6 and −6, respectively. This aspect is shown for groups of correlative words in FIG. 5, in which the groups of correlative words are chosen for numbers having absolute values 1-8, 9-36 and so on.

In accordance with the present invention, first or natural 8-bit binary code words corresponding to the numbers in each group are mapped into or converted to second 8-bit binary code words (hereinafter referred to as DSVCC binary code words), such that the DSVCC binary code words in each group have the same CDS value. For example, the group of natural binary code words having absolute values 1-8 are converted to DSVCC binary code words having absolute values (hereinafter also referred to as replacement values) 1, 2, 4, 8, 16, 32, 64, and 128, as shown in FIG. 4A, all of the DSVCC words having CDS values of −6. The replacement values and CDS values for the DSVCC words in each group are shown in FIGS. 4A-4C. In this manner, DSVCC words corresponding to the natural or original binary code words in each group have the same CDS value.

In accordance with the present invention, alternate ones of the 8-bit DSVCC binary code words are inverted. For example, a natural binary code word having an original value of 53 is converted to a DSVCC code word having a replacement value of 49. The DSVCC code word is represented by [00110001] and has a CDS value of −2. The inverted DSVCC code word is therefore represented by [11001110] corresponding to an absolute decimal value (replacement value) of 206 and having a CDS value of +2. It is to be noted that this latter inverted DSVCC code word corresponds to a natural binary code word having an absolute decimal value (original value) 202. It is also to be remembered that the DSVCC code words in each group corresponding to correlative natural binary code words have the same CDS value −6. In this manner, alternate ones of the DSVCC code words which are inverted have CDS values with equal magnitudes but opposite polarities. For example, if a digital information signal includes successive correlative words having absolute values 1-8, the DSVCC code words corresponding to each such correlative word have a CDS value −6. If alternate DSVCC code words are inverted, that is, code words corresponding to numbers 2, 4, 6 and 8, for example, the CDS values will successively read as follows: −6, +6, −6, +6, −6, +6, −6, and +6, respectively. If the CDS values are combined, the total DSV will be equal to zero, and therefore provide no or substantially reduced DC components for the digital information signal to be recorded or transmitted.

Figure 6:
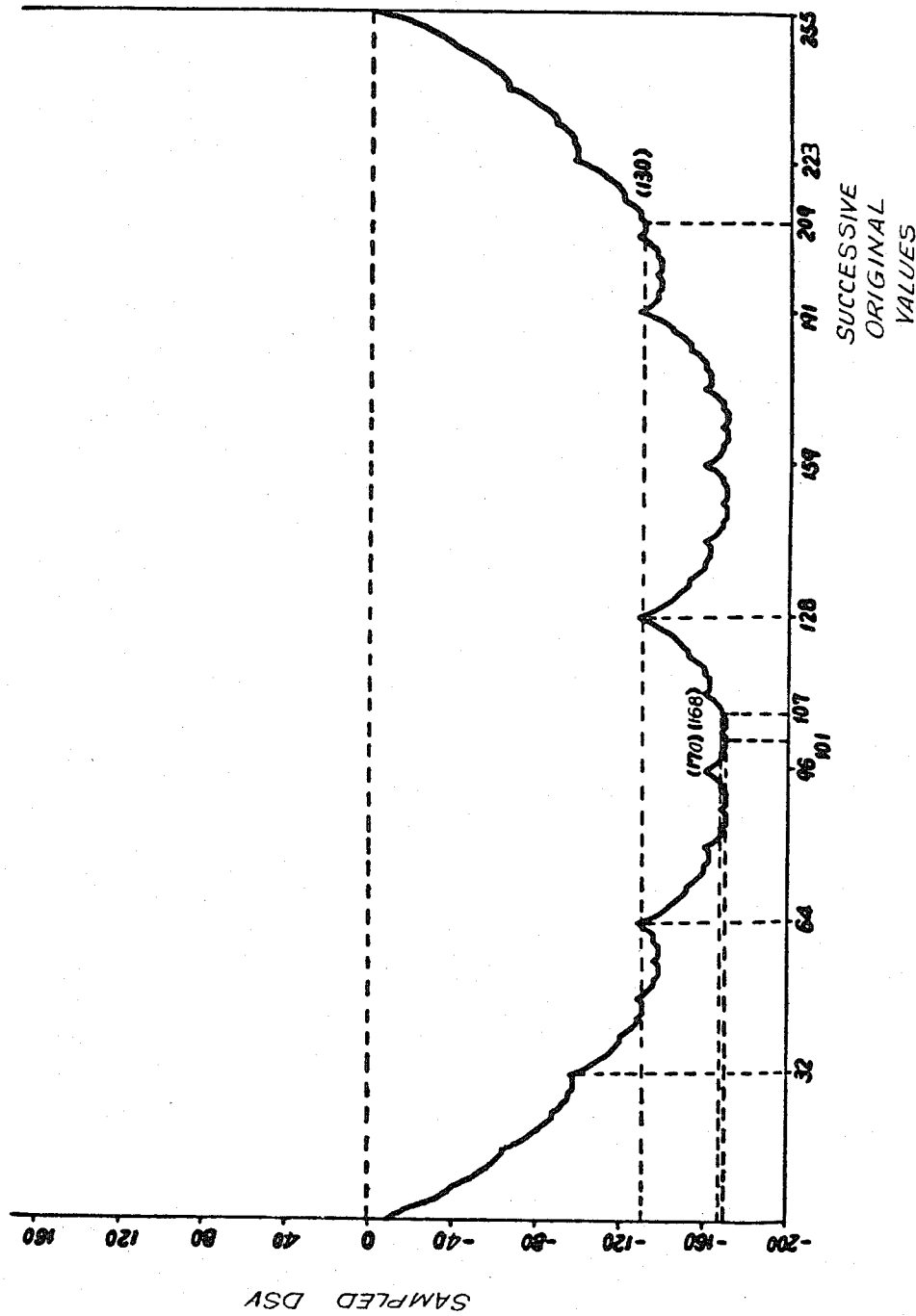
FIG. 6 is a graphical diagram illustrating the running DSV for all possible binary 8-bit digital information words in succession.
Figure 7:
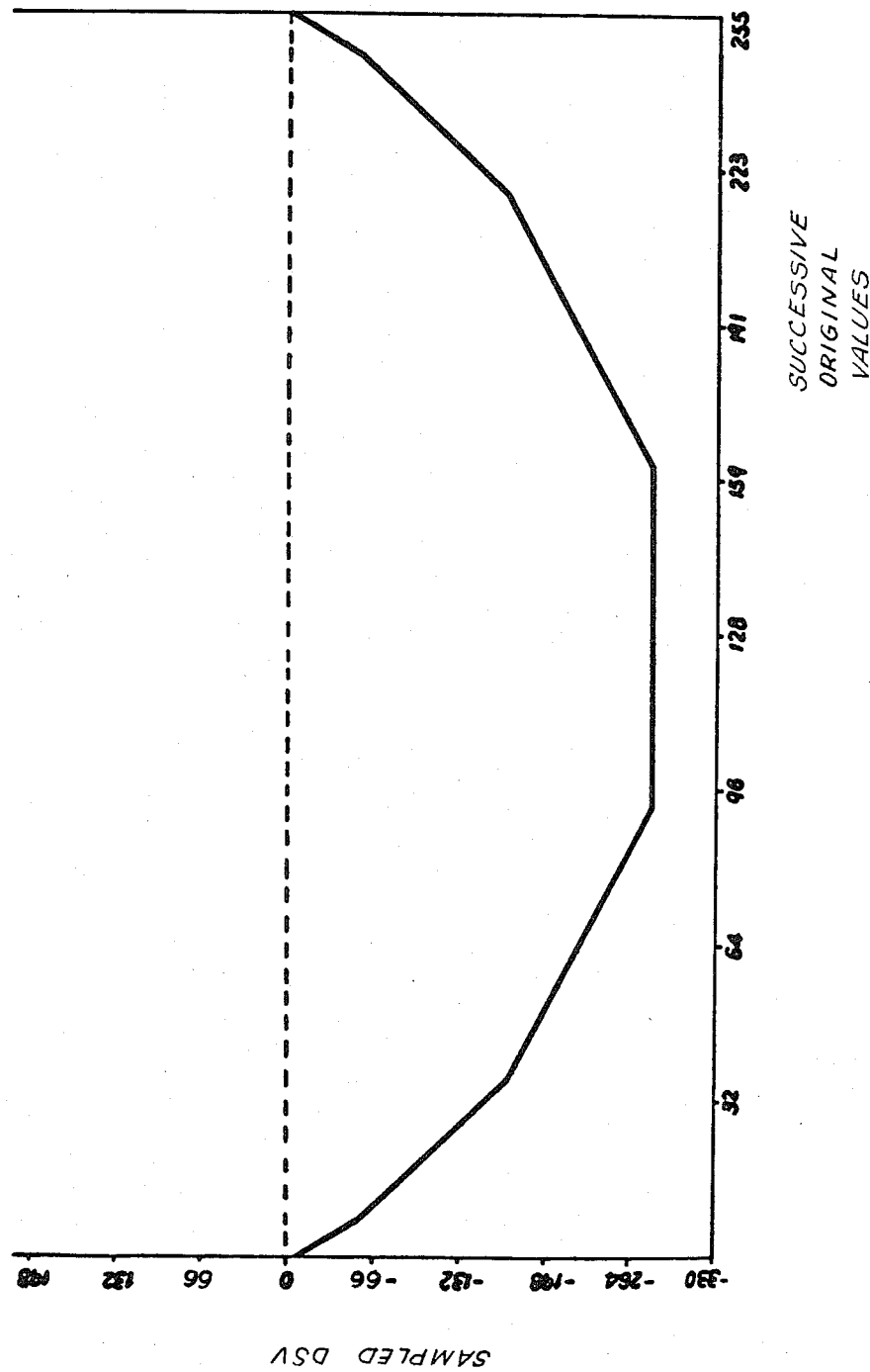
FIG. 7 is a graphical diagram illustrating the running DSV of all possible binary 8-bit digital information words used in FIG. 6 and as encoded in accordance with the present invention.

A graphical diagram of the running DSV for natural or original 8-bit words having successive absolute values 0-255 is shown in FIG. 6 and is obtained by cumulatively adding successive CDS values corresponding to such original 8-bit words. It is to be appreciated from the graphical diagram of FIG. 6 that the value of the running DSV is non-uniform or not constant for groups of successive numbers. Thus, since the CDS values for correlative words may vary by a large amount, mere inversion of alternate natural or original binary code words will not produce the same results of reduction of the total DSV as with the present invention. For example, for the numbers 127 and 128, if the natural binary code word for the number 128 is inverted, the CDS value for such inverted word becomes +6. If the CDS value for the number 127 is then added to the CDS value for the inverted natural binary code word corresponding to the number 128, the total DSV for both binary code words becomes +12, which results in an increase in the DSV value, rather than a decrease thereof. On the other hand, as shown in FIG. 7, correlative natural binary code words are grouped so that DSVCC code words corresponding to the correlative natural binary code words in each group have the same CDS value. Thus, for example, the natural binary code word having an absolute value 127 is converted to a DSVCC code word having a replacement value 120 and a CDS value of zero and the number 128 is converted to a DSVCC code word having a replacement value 135 and a CDS value of zero. If the DSVCC code word corresponding to the original number 128 is inverted, the total DSV for the DSVCC code word corresponding to the number 127 and the inverted DSVCC code word corresponding to the number 128 is zero, rather than +12. In this regard, the total DSV for the encoded digital information signal is substantially reduced to minimize the DC content thereof. It is to be appreciated that, with a data information signal capable of having absolute values between 0 and 255, data levels between 16 and 240 are most commonly used and the probability of data having an absolute value at or around 128 is extremely high. It is to be appreciated that DSVCC code words having absolute values at or around 128 have CDS values of zero. The CDS values for respective groups increase as the groups become further removed from the central or high probability value of 128, as shown in FIGS. 4A–4C and FIG. 7. Thus, because of such groupings, the present invention greatly reduces the total DSV of the digital information signal.

The advantages of the present invention are shown more particularly by the table of FIG. 3. As shown therein, for a random digital information signal, in natural binary code form, and recorded in one track by a VTR, the final value of the DSV is −21,358. When alternate words of the natural binary code are inverted, the final value of the DSV is −810. On the other hand, with the present invention, when the natural binary code words are converted to DSVCC code words in accordance with the table of FIGS. 4A–4C, the final value of the DSV is −46, 864. When alternate words of the DSVCC code words of the digital information signal are inverted, the final value of the DSV is −28. In other words, by utilizing the inverting process with the DSVCC code words, a final value of the DSV which is closer to zero can be obtained than with the natural binary code words, even when alternate ones of the latter are inverted. In this regard, since the final value of the DSV with the present invention is approximately 1/30th of the final value of the DSV that can be obtained with the naturally binary code when the latter uses an inverting process, the DC content of the digital information signal is substantially reduced. In addition, the maximum value of the DSV for the digital information signal with the natural binary code is 21,358 and is reduced to 944 when alternate ones of the natural binary code words are inverted. On the other hand, although the maximum value of the DSV for the DSVCC code words is 46,864, when alternate ones of the DSVCC code words are inverted, the maximum value of the DSV is reduced substantially to 104. In like manner, the average value of the CDS for each code word is reduced from a value of −0.02 for the natural binary code using the inverting process to a value of −0.0007 for DSVCC code words when alternate ones of the latter are inverted.

It is to be appreciated that a method of decoding which is complementary to the above-described method of encoding according to the present invention should be provided, as will be discussed more fully with respect to ensuing apparatus according to the present invention.

Apparatus for performing the method according to the present invention is shown in FIG. 1 and includes an analog-to-digital (A/D) converter 12 which converts an analog information signal, for example, a color video signal, supplied from an input terminal 10, into digital form. In particular, A/D converter 12 samples the analog video signal at a sampling frequency $f_S = 4f_{SC}$, where $f_{SC}$ is the color sub-carrier frequency of the color video signal. A/D converter 12 then converts the sampled color video signal to an 8-bit natural binary code and supplies the 8-bit natural binary code in parallel to a DSV control and coding (DSVCC) circuit 14 in which each 8-bit binary code word is converted or mapped into a second DSVCC 8-bit binary code word classified by the CDS value thereof, and in accordance with the table of FIGS. 4A–4C. For example, DSVCC encoder 14 may include a random access memory (ROM) in which the DSVCC code words are stored at addresses designated by the natural binary code words. The DSVCC code words from encoder 14 are then supplied to an inverting processor 16 which inverts alternate ones of successive DSVCC code words, in accordance with the present invention. Since the input color video signal is strongly correlative, the DSV of the digital information signal from inverting processor 16 tends to converge to zero to reduce the DC content thereof, without increasing the recording bit rate of the signal. The digital information signal from inverting processor 16, which is in parallel form, is then converted to serial form in a parallel-to-serial converter 18 and recorded on a magnetic tape by a video tape recorder (VTR) 20, in which data corresponding to one field of the color video signal is recorded on one slant track of the tape. During reproduction, the data reproduced by VTR 20 is supplied to a serial-to-parallel converter 22 which converts the serial data to parallel form. The parallel reproduced data is then supplied to an inverting decoder 24 which inverts the same alternate ones of the DSVCC code words that had previously been inverted by inverting processor 16 so as to restore the original DSVCC code words. The output from inverting decoder 24 is then supplied to a DSVCC decoder 26 which converts or maps the DSVCC code words back to the natural binary code words in a complimentary manner to the operation of encoder 14. As with encoder 14, decoder 26 may include a ROM in which the natural binary code words are stored at address locations indicated by the DSVCC code words. The natural binary code is then supplied to a digital-to-analog (D/A) converter 28 which converts the color video signal back to analog form and supplies the same to an output terminal 30.

It is to be appreciated that various modifications can be made with the present invention by one of ordinary skill in the art. For example, the conversion table of FIGS. 4A–4C is merely an illustrative example of a mapping operation that can be used with the present invention and the present invention is not limited by that particular mapping operation. Further, although it is stated that the inversion occurs for alternate ones of the DSVCC code words, inversion may occur alternately for a plurality of the DSVCC code words. For example, for original numbers 1–8, DSVCC code words for numbers 1–4 may be inverted, with DSVCC code words corresponding to original numbers 5–8 remaining non-inverted or, as another example, DSVCC code words in alternate horizontal lines of the color video signal may be inverted. The present invention is also not limited to a color video signal, as long as the information signal is correlative. The present invention is also not limited to recording of the digital information signal by a VTR but may also be used for transmission thereof.

Having described a specific preferred embodiment of the invention with reference to the accompanying drawings, it is to be understood that the present invention is not limited to that precise embodiment and that various changes and modifications may be effected therein by one skilled in the art without departing from the scope or spirit of the invention as defined in the appended claims herein.

What is claimed is:

1. A method for use with a binary digital signal provided at a source bit rate and formed of a plurality of first n-bit words that correlate in value such that successive words have values close to each other and which have a digital sum variation to produce an encoded binary digital signal having a reduced digital sum variation without increasing the source bit rate, comprising the steps of:
    arranging second n-bit words into groups classified by the digital sum variation values thereof, so that the second n-bit words in each group have substantially the same digital sum variation values;
    substituting said groups of second n-bit words for groups of corresponding first n-bit words having the same number of words and being arranged in sequential order; and
    inverting every $m^{th}$ one of said second n-bit words, where $m = 2, 3, \ldots$ 2. A method according to claim 1; in which $n = 8$.

3. A method according to claim 1; in which each of said predetermined groups includes a plurality of first n-bit words having successively increasing integer values.

4. A method according to claim 1; in which at least one first n-bit word not included in any of said predetermined groups is converted into at least one corresponding second n-bit word which is identical to the respective at least one first n-bit word.

5. A method according to claim 1, further comprising the step of arranging said first n-bit words in said groups in succesively decreasing numerical order.

6. A method according to claim 1; in which said binary digital signal is a digitized video signal comprised of a plurality of horizontal lines, each horizontal line being formed of g first n-bit words.

7. A method according to claim 6, including the further step of inverting ever $r^{th}$ one of said plurality of horizontal lines, where $r = 2, 3, \ldots$ 8. A method of decoding an encoded binary digital signal comprised of a plurality of n-bit words formed by converting each of a plurality of first n-bit words having a digital sum variation into a respective second n-bit word having a digital sum variation such that, with respect to predetermined groups of correlative first n-bit words in which successive first n-bit words have values close to each other, said second n-bit words corresponding to said first n-bit words in each respectively group have the same digital sum variation, and inverting every $m^{th}$ one of said second n-bit words, where $m = 2, 3 \ldots$, comprising the steps of:
    inverting every $m^{th}$ one of said n-bit words of said encoded binary digital signal to form a non-inverted encoded binary digital signal comprised of said second n-bit words; and
    converting each of said second n-bit words back to the respective one of said first n-bit words to form an original binary digital signal.

9. Apparatus for encoding a binary digital signal provided at a source bit rate and formed of a plurality of first n-bit words having a digital sum variation to produce an encoded binary digital signal having a reduced digital sum variation at said source bit rate, comprising:
    means for converting each first n-bit word into a second n-bit word having a digital sum variation such that, with respect to predetermined groups of correlative first n-bit words in which successive words have values close to each other, said means for converting including means for arranging said second n-bit words in groups having the same digital sum variation; and
    means for inverting every $m^{th}$ one of said n-bit words, where $m = 2, 3 \ldots$ 10. Apparatus according to claim 9; in which said binary digital signal is a digitized video signal comprised of a plurality of horizontal lines, each horizontal line being formed of q first n-bit words.

11. Apparatus according to claim 9; in which $n = 8$.

12. Apparatus for decoding an encoded binary digital signal comprised of a plurality of n-bit words formed by converting each of plurality of first n-bit words having a digital sum variation into a respective second n-bit word having a digital sum variation such that, with respect to predetermined groups of correlative first n-bit words in which successive first n-bit words have values close to each other, said second n-bit words corresponding to said first n-bit words in each respective group have the same digital sum variation, and inverting every $m^{th}$ one of said second n-bit words, where $m = 2, 3 \ldots$, comprising:
    means for inverting every $m^{th}$ one of said n-bit words of said encoded binary digital signal to form a non-inverted encoded binary digital signal comprised of said second n-bit words; and
    means for converting each of said second n-bit words back to the respective one of said first n-bit words to form an original binary digital signal.

* * * * *

UNITED STATES PATENT OFFICE
CERTIFICATE OF CORRECTION

Patent No. 4,531,153    Dated July 23, 1985

Inventor(s) Kenji Watanabe

It is certified that error appears in the above-identified patent and that said Letters Patent are hereby corrected as shown below:

First page, after line for item [22], insert the following:

[30]    Foreign Application Priority Data

October 31, 1981  Japan ...............175267/81

Col. 7, line 40 -change "ever" to --every--.

Col. 8, line 1 -change "tively" to --tive--.

Signed and Sealed this

Eleventh Day of February 1986

[SEAL]

Attest:

DONALD J. QUIGG

Attesting Officer     Commissioner of Patents and Trademarks